Sept. 25, 1956      A. A. WOLF      2,764,704

ELECTRIC MOTOR PROVIDED WITH COOLING MEANS

Filed June 10, 1954

INVENTOR
Alfred A. Wolf

BY

ATTORNEY

United States Patent Office 2,764,704
Patented Sept. 25, 1956

2,764,704

ELECTRIC MOTOR PROVIDED WITH COOLING MEANS

Alfred A. Wolf, Dallastown, Pa.

Application June 10, 1954, Serial No. 435,709

5 Claims. (Cl. 310—61)

This invention relates to improvements in an electric motor and more particularly to providing the same with cooling means for dissipating the heat generated by an electric motor during variable speed operation thereof in either direction. A. C. motors now may be controlled by voltage regulating means which permit such motors to be operated at variable speeds, such motors being useful, for example, in installations requiring either considerable horsepower, relatively small fractional horsepower, and all ranges therebetween. Motors of this type are very convenient in operating various mechanisms continuously at variable speeds, from stalled to almost synchronous speeds, as well as in different directions, as desired. Under such circumstances, as well as other circumstances, particularly where the motor is operating somewhat as a brake or otherwise at speeds less than normal speeds while under full torque loads of the motor, considerable heat is generated and such heat impairs the efficiency of the motor as well as being harmful to the insulation on the various conductors in the motor and the lubrication in the bearings of said motor.

In order to expand the use, as well as the expected life of the motor, it is the purpose of the present invention to provide in motors of the foregoing type and particularly in A. C. multiphase motors, mechanism operable preferably at all times during the operation of the motor to develop and pass a fluid current particularly through the rotor of the motor in an efficient manner to lower the temperature of the motor by dissipating effectively a substantial percentage of the heat generated by the motor under operating conditions such as those described above. The rotor of the motor has especially been designed, in accordance with the present invention, to increase the efficiency of the cooling effect of a fluid current while passing through the rotor for purposes of cooling the same. The rotor also has been designed in accordance with the invention to produce a motor which will have long life and be relatively inexpensive to manufacture, the cooling mechanism also being simple and relatively inexpensive to construct and install in the motor, yet the cooling mechanism is highly efficient and effective to produce the desired cooling device.

Details of the aforementioned beneficial characteristics of the invention, as well as advantages thereof, are set forth in the following specification and illustrated in the accompanying drawing comprising a part thereof.

Figure 1:
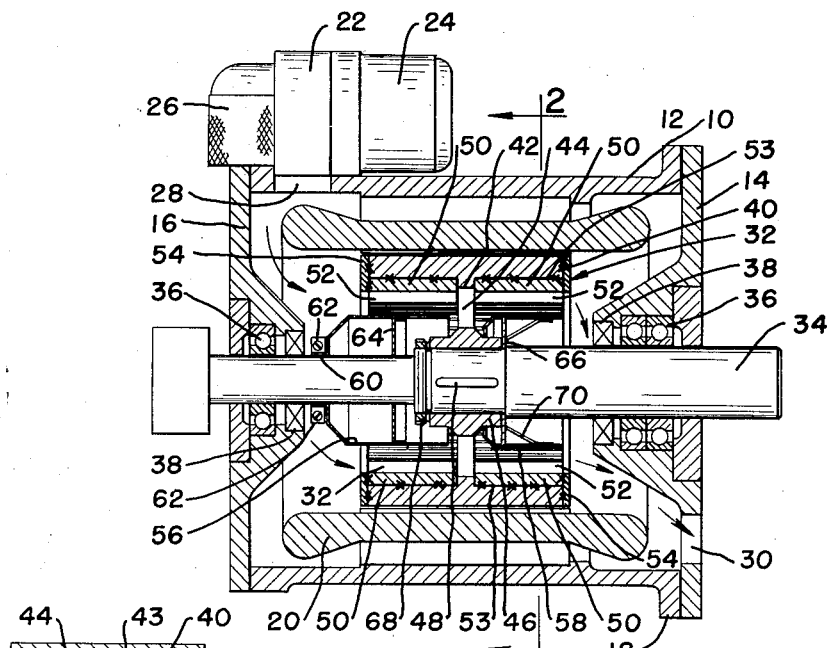
Fig. 1 is a longitudinal sectional view of an exemplary motor embodying the principles of the present invention, this view being taken upon a vertical plane bisecting the motor axially.

Referring to the drawing, and particularly Fig. 1, the motor 10 comprises a preferably impervious cylindrical shell 12, the opposite ends of which are connected suitably to end plates 15 and 16 which may be disc-like. It is not intended that the present invention shall be restricted to have a relatively impervious casing or housing but it has been found that the efficiency of the cooling mechanism to be described hereinafter is maximum when the casing or housing of the motor is impervious except for the inlet and outlet ports for the cooling medium.

It will be understood also that the housing illustrated herein for the motor may be of any desired shape and configuration. Further, if desired, part of the housing such as the flange 18 and the peripheral portion of the end plate 14 may be secured directly to mechanism, for example, which is to be operated by the motor, or which is to support the motor in operative position.

The motor is provided with a conventional field or stator 20, supported by the cylindrical shell 12 or otherwise in any conventional manner. Inasmuch as the wiring and other circuit means of the motor do not comprise part of the present invention, no circuit or conductors are illustrated herein, it being understood that these are conventional.

Mounted preferably upon the housing of the motor is a relatively small fan 22 which is driven by an electric motor 24 of small capacity. The fan 22 also has an intake 26 which, if desired, may have a suitable screen thereover to filter the air or other fluid current which is to be forced by the fan 22 into and through the interior of the motor for purposes of cooling the same. Also, in the preferred embodiment of the invention, the electric motor 24 which drives the fan is suitably connected in the circuit of the motor 10 so that the fan motor 24 will operate at all times when the motor 10 is connected in the circuit and, correspondingly, be disconnected when the motor 10 is disconnected from the circuit. The fan 22 operates preferably at a constant speed, independently of the speed of the motor 10, and discharges through an inlet port 28 formed, for example, in the cylindrical shell 12 of the motor housing. Said housing also is provided with a suitable exit or exhaust port 30 through which the fluid current is discharged after passing through the rotor 32 of the motor. If desired, any number of inlet and exhaust ports for the fluid medium may be provided, as may be found expedient. Likewise, the shape and characteristics thereof also may be varied from those illustrated herein, as desired or required.

The rotor 32 of the motor is rotatably positioned within the field 20, the rotor 32 being supported by the motor shaft 34. Opposite end portions of the shaft 34 are supported in suitable anti-friction bearings 36, which are supported by the end plates 14 and 16, for example, sealing rings 38 also being provided if desired.

Preferably, the motor shaft 34 is provided with a plurality of different diameters. For example, as viewed in Fig. 1, the left-hand end has the smallest diameter of any of the sections while the right-hand end has the largest diameter and the intermediate portion has a diameter between that of the end portions, for purposes to be described.

Figure 3:
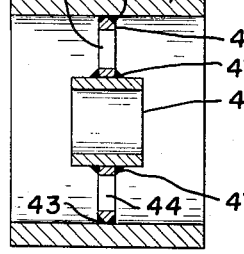
Fig. 3 is a longitudinal sectional view of the basic elements of the rotor shown in Figs. 1 and 2 so as to better to illustrate certain features thereof.
Figure 2:
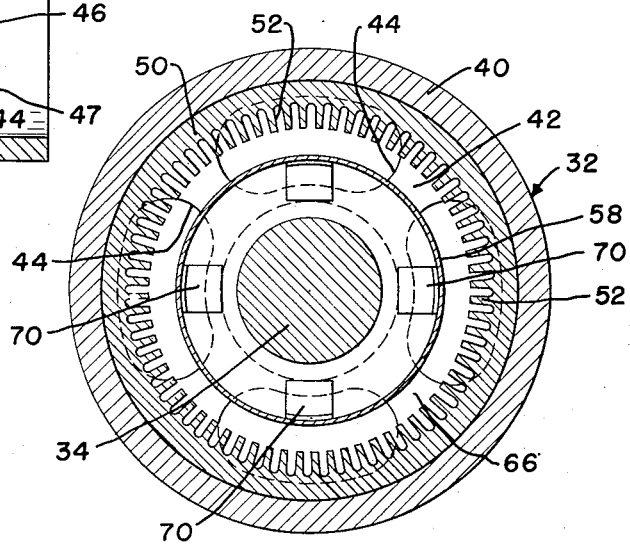
Fig. 2 is a transverse vertical sectional view of the rotor of the motor shown in Fig. 1, Fig. 2 being taken on the line 2—2 of Fig. 1.

Details of the rotor 32 are best shown in Figs. 2 and 3. Said rotor comprises preferably a fabricated weldment consisting of an outer peripheral member or shell of solid mild steel 40. Said shell preferably is cylindrical. Fixed to the interior thereof, intermediately of the ends of the shell 40 is a connecting means comprising a web-like disc 42, the periphery of which is welded at 43 to the inner surface of the shell 40, as shown clearly in Fig. 3. The web-like disc 42 also is provided with a plurality of holes or passages 44 which are preferably kidney-shaped for purposes of affording maximum throughway commensurate with strength for supporting shell 40, thus readily permitting the passage of cooling fluid currents through the rotor from one end to the other. The web-like disc 42 also is apertured centrally and receives a hub 46, to which it is connected, for example by welding at 47, as shown best in Fig. 3. The hub 46 is splined to receive a key 48 for purposes of locking the rotor against rotation relative to the intermediate portion of shaft 34, referred to above.

Closely fitting within the rotor shell 40 and extending inward toward the web-like disc 42 from either end of the rotor shell is a pair of finned sleeves 50, the outer surfaces of which closely engage the inner surface of the shell 40. Each of the finned sleeves 50 are provided with radially and inwardly directed fins 52 which are best shown in Fig. 2. By forming the sleeves 50 separately from the shell 40, the fins 52 may be formed by broaching. The co-engaging surfaces of the shell 40 and the finned sleeves 50 preferably are completely silver soldered, as shown at 53, for purposes of providing a continuous heat transfer bond between these members. Preferably, the finned sleeves 50 extend between the substantially central web-like disc 42 and the ends of the shell 40. However, the finned sleeves 50 may be made integral with the rotor shell 40, the web-like disc 42, and the hub 46 by casting if a cast construction is desired. The ends of the rotor preferably are finished by silver soldering thereto end rings 54 which may be formed, for example, by blanking the same from copper sheet stock. The perimeters of the end rings 54 preferably are coextensive with the outer surface of shell 40.

The purpose of the fins 52 is to facilitate the conducting of heat from the rotor 32 and particularly the shell 40, said heat being absorbed by fluid currents passing into entrance port 28 and through the interior of the rotor 32, said passage being permitted by the apertures 44 in the web-like disc 42, and thence through the exhust port 30. The path of such current generally is indicated by the arrows shown in Fig. 1.

In order to minimize the capacity of the fan 22, as well as the power of motor 24 required to drive the same for purposes of producing a fluid current of desired capacity to effect the required amount of cooling in the motor 10, the present invention also provides means for restricting the size of the passage through the rotor 32 and also effectively forcing the cooling medium stream into contact with the heat transferring fins 52 and toward the peripheral portion of said rotor, as well as insuring that fluid currents disposed within or passing through the spaces between the fins 52 will not become entrapped therein and thereby decrease the efficiency of the stream of fluid medium. Referring to Fig. 1 particularly, it will be seen that a pair of annular baffles 56 and 58 are provided, which conveniently may be formed from sheet metal or other suitable material, said baffles being anchored to the drive shaft 34 by suitable means to be described. The baffle 56 for example is provided with a clamping collar 60 which may be split and clamped by suitable screws 62. A disc-like bracing web 64 may be fixed to the interior of the baffle 56, the bracing web also being centrally apertured so as snugly to engage the outer surface of shaft 34 so as to prevent vibration of the baffle while rotating with the rotor as well as while the fluid current is passing between the baffle and interior of the rotor.

The baffle 58 generally is similar to baffle 56 but different means are provided, for example, to clamp the same to the shaft 34. From Fig. 1, it will be seen that a disc-like web 66 is secured to the interior of the baffle 58, said web 66 being centrally apertured to receive the intermediate keyed portion of the shaft 34. It will be seen that the web 66 is disposed against the shoulder formed between the largest diameter of the shaft 34 and the intermediate portion thereof which is keyed to the hub 46. When the hub 46 is locked against the shoulder referred to, the web 66 will be clamped between opposed faces of the hub and shoulder.

Any suitable means such as a locking nut 68 may be used to secure the rotor 32 against movement lengthwise relative to the shaft 34 and also insuring the proper positioning and locking of the baffle 58 to the rotor. Inasmuch as the rotor 58 is provided with a relatively long skirt portion, vibration thereof may be minimized if not eliminated by providing a plurality of bracing struts 70, clearly shown in Figs. 1 and 2, and secured to the web 66 and baffle 58 by soldering, welding or otherwise.

In operation, the fan 22 will commence operating when the motor 10 is energized and will discharge a stream of cooling fluid, such as air, preferably at a constant speed, into the interior of the housing of the motor 10, regardless of the speed or direction of rotation of said motor, and against the baffle 56. Due to the relatively large diameter of the baffle 56, only a relatively narrow annular space is provided between the tips of the fins 52 and the outer surface of baffle 56. Thus, the restriction of the passage within the rotor 32 into a cylindrical space closely adjacent the fins 52 increases the velocity of the fluid current moving through said space adjacent the peripheral or shell member 40 due to the pressure of said stream being increased while moving through said restricted space.

Such increase in pressure and velocity will insure that the fluid medium or stream passing between the fins 52 will be kept moving rather than becoming trapped therein, thereby increasing the efficiency of the cooling afforded by the invention. It will be understood of course that, if desired, the baffles 56 and 58 may be continuous. However, by forming the same as illustrated herein, the cost thereof is materially lessened. The baffles 56 and 58 cooperate to increase the pressure and velocity of the fluid current while moving through the rotor 32 from end to end and prior to being discharged through the exhaust port 30.

From the foregoing, it will be seen that the present invention provides highly effective means for cooling the rotor of an electric motor, said means requiring only a minimum amount of power to drive means such as a motor driven fan or pump to force fluid under pressure thereof through the rotor of the motor so as to afford a cooling technique which is highly efficient in operation by directing the cooling medium preferably at a constant speed and intimately in contact with the critical areas of the motor where the heat is generated and therefore the heat transfer takes place to greatest advantage. While air is contemplated as the preferred cooling medium, other gases or liquid mediums may be used. If a liquid medium is used, a pump may be substituted for fan 22 and connected in a suitable conduit system. The interior of motor 10 would of course also have to be waterproofed suitably to permit the use of liquid mediums.

Further, an articulated rotor is formed preferably by welding a number of solid steel members, such as the cylindrical shell 40, a web-like disc 42, and hub 46 disposed centrally of the disc and shell. The finned heat exchange sleeves 50 preferably are silver soldered to the interior of shell 40. In the construction of these sleeves, the solid wall areas between the roots of the fins 52 and the outer surfaces thereof are maintained at a minimum, while providing adequate strength, thus not materially interfering with the magnetic path of current within the rotor. By silver soldering the sleeves 50 and shell 40 particularly together, the dissipation of heat by transfer is facilitated since a completely solid construction is approached as far as possible.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. A rotor for an electric motor constructed and arranged to have a fluid current passed internally therethrough to cool the same and comprising in combination, a hub arranged to be secured to rotatable means, a substantially cylindrical solid iron peripheral member surrounding and spaced from said hub, connecting means extending between and fixed to said hub and peripheral member, said connecting means having openings therethrough to permit the passage of fluid currents from one end to the other of said rotor, and substantially cylindrical iron members having circumferentially spaced integral fins thereon directed radially inward therefrom and disposed axially of said members, said finned members being positioned interiorly of and fixed to said peripheral member in efficient heat transfer relationship therewith.

2. A rotor for an electric motor constructed and arranged to have a fluid current passed internally therethrough to cool the same and comprising in combination, a hub arranged to be secured to rotatable means, a solid iron peripheral member surrounding said hub and spaced therefrom, connecting means extending between and fixed to said hub and peripheral member, said connecting means having openings therethrough to permit the passage of fluid currents from one end to the other of said rotor, fins fixed to the interior of said peripheral member and extending longitudinally thereof in circumferentially spaced relationship to each other, said fins extending substantially radially inward toward but spaced from the axis of said member, and baffle-like directing means surrounding the axis of said peripheral member so as to be operable to direct a fluid current effectively against said fins and interior of said peripheral member to dissipate heat therefrom.

3. The rotor set forth in claim 2 further characterized by said baffle-like directing means being substantially cylindrical and interconnected to said peripheral member and removable therewith.

4. A rotor for an electric motor comprising in combination, a substantially cylindrical solid iron peripheral member, a shaft disposed axially of said member, an apertured disc-like connecting means extending transversely to said shaft and between said shaft and peripheral member and fixed thereto, the apertures in said connecting means permitting the passage of fluid currents from one end to the other of said rotor, radially extending fins fixed to the interior of said peripheral member in circumferentially spaced relationship to each other and extending longitudinally of said member, and cylindrical baffle means surrounding said shaft and fixed thereto for rotation therewith, said baffle means being spaced from said shaft and disposed close to the outer extremities of said fins to provide a restricted annular passageway for heat dissipating fluid currents adjacent said fins and the interior of said peripheral member.

5. The rotor set forth in claim 4 further characterized by said disc-like connecting means being positioned intermediately of the ends of said peripheral member and said baffle means extending longitudinally of said member substantially the full length thereof.

References Cited in the file of this patent

UNITED STATES PATENTS

| 558,120 | Thomson | Apr. 14, 1896 |
| 1,751,424 | Rosenthal | Mar. 18, 1930 |
| 1,913,211 | Prince | June 6, 1933 |
| 2,246,777 | Bordeaux et al. | June 24, 1941 |
| 2,610,992 | Johns | Sept. 16, 1952 |

FOREIGN PATENTS

| 105,578 | Sweden | Sept. 29, 1942 |
| 385,022 | France | Feb. 25, 1908 |